Dec. 30, 1941.  W. A. BEHRENS  2,267,783
APPARATUS FOR MAKING SLIDE FASTENER STRINGERS
Filed Dec. 28, 1939  12 Sheets-Sheet 1

INVENTOR.
Walter A Behrens
BY
ATTORNEY.

Dec. 30, 1941.    W. A. BEHRENS    2,267,783
APPARATUS FOR MAKING SLIDE FASTENER STRINGERS
Filed Dec. 28, 1939    12 Sheets-Sheet 2

INVENTOR.
Walter A. Behrens
BY
his ATTORNEY.

Dec. 30, 1941. W. A. BEHRENS 2,267,783
APPARATUS FOR MAKING SLIDE FASTENER STRINGERS
Filed Dec. 28, 1939 12 Sheets-Sheet 3

FIG. 6.

INVENTOR.
Walter A Behrens
BY
his ATTORNEY.

Dec. 30, 1941.   W. A. BEHRENS   2,267,783
APPARATUS FOR MAKING SLIDE FASTENER STRINGERS
Filed Dec. 28, 1939   12 Sheets-Sheet 5

INVENTOR.
Walter A. Behrens
BY
ATTORNEY.

Dec. 30, 1941.     W. A. BEHRENS     2,267,783
APPARATUS FOR MAKING SLIDE FASTENER STRINGERS
Filed Dec. 28, 1939     12 Sheets-Sheet 6

INVENTOR.
Walter A. Behrens
BY
his
ATTORNEY.

Dec. 30, 1941.  W. A. BEHRENS  2,267,783
APPARATUS FOR MAKING SLIDE FASTENER STRINGERS
Filed Dec. 28, 1939  12 Sheets-Sheet 7

INVENTOR.
Walter A. Behrens
BY
his ATTORNEY.

Dec. 30, 1941.  W. A. BEHRENS  2,267,783
APPARATUS FOR MAKING SLIDE FASTENER STRINGERS
Filed Dec. 28, 1939  12 Sheets-Sheet 8

FIG.16.

INVENTOR.
Walter A. Behrens
BY
ATTORNEY.

Dec. 30, 1941. W. A. BEHRENS 2,267,783
APPARATUS FOR MAKING SLIDE FASTENER STRINGERS
Filed Dec. 28, 1939 12 Sheets-Sheet 10

INVENTOR.
Walter A. Behrens
BY
ATTORNEY.

Dec. 30, 1941.  W. A. BEHRENS  2,267,783
APPARATUS FOR MAKING SLIDE FASTENER STRINGERS
Filed Dec. 28, 1939    12 Sheets-Sheet 11

INVENTOR.
Walter A. Behrens
BY
his   ATTORNEY.

FIG.25.

Patented Dec. 30, 1941

2,267,783

UNITED STATES PATENT OFFICE 2,267,783

APPARATUS FOR MAKING SLIDE FASTENER STRINGERS

Walter A. Behrens, Jamaica, N. Y., assignor to Port Fastener Corporation, New York, N. Y., a corporation of Delaware Application December 28, 1939, Serial No. 311,398

14 Claims. (Cl. 153—1)

This invention relates to improvements in the apparatus for forming continuous slide fastener stringers.

Broadly, it is an object of this invention to provide a novel apparatus for intermittently forming and securing scoops onto a tape in spaced relationship in association with a tape jump mechanism which rapidly and efficiently forms separation zones between groups of the scoops. This case is a continuation in part of my copending application, Serial No. 241,195, filed on November 18, 1938, and entitled "Method of and apparatus for forming slide fastener stringers."

In accordance with the present invention the slide fasteners are made in a continuous manner using a continuous metal strip progressively shaped into scoops having head and jaw portions intermittently clamped in spaced relationship onto the tape. The tape is correspondingly intermittently displaced transversely of its normal feed path during its rest period to the jaws of the scoops. After scoop clamping operations, the tape is returned to its position for the intermittent advancing operation.

An important feature of the present invention resides in the novel apparatus for effecting a jump or predetermined spacing between attached groups of scoops to determine the length of the slide fasteners produced. Previous attempts providing such spaces have been unsatisfactory in that the either too large time interval was required, or that undue mechanical strains were encountered in the machine, or shorter periods were used. The present invention is directed to novel electro-mechanical means for effecting the tape jumping operation between scoop fastening cycles to effect the blank spaces on the tape in a predetermined manner. A timing chain is employed coupled to the machine drive for synchronous operation and adjusted in length to initiate the jumps in predetermined relation with the stringer formation.

Electro-mechanical arrangements are provided for effecting the tape jumps of any desired length within the order of four or less cycles or strokes of the machine, a cycle corresponding to the time between successive scoop forming and attaching operations. The rapid jumping or advancing of the tape for the blank sections thereof renders the production of a given machine more efficient as to the stringer output, which in practical embodiments may be as high as 25% or greater. Novel interlocking arrangements are incorporated in the mechanism to insure safety during the tape jumping intervals without interfering with the associated operations of the machine or unduly straining the mechanism.

It is accordingly among the objects of the present invention to provide a novel means for jumping or otherwise accelerating the advancement of the tape during stringer formation to substantially speed up the overall production of stringers in a given machine; to provide novel electro-mechanical tape jumping means employing a continuously driven timer chain and associated successively operated relays which are interlocked to insure proper jumping of the tape without interfering with the other components thereof; and to provide a novel tape jumping arrangement operated independently of the stringer machine, and without straining any portion of the mechanism thereof.

These and other objects of the present invention will become more evident in the following description taken in connection with the drawings, in which.

Figures 1, 2, 3:
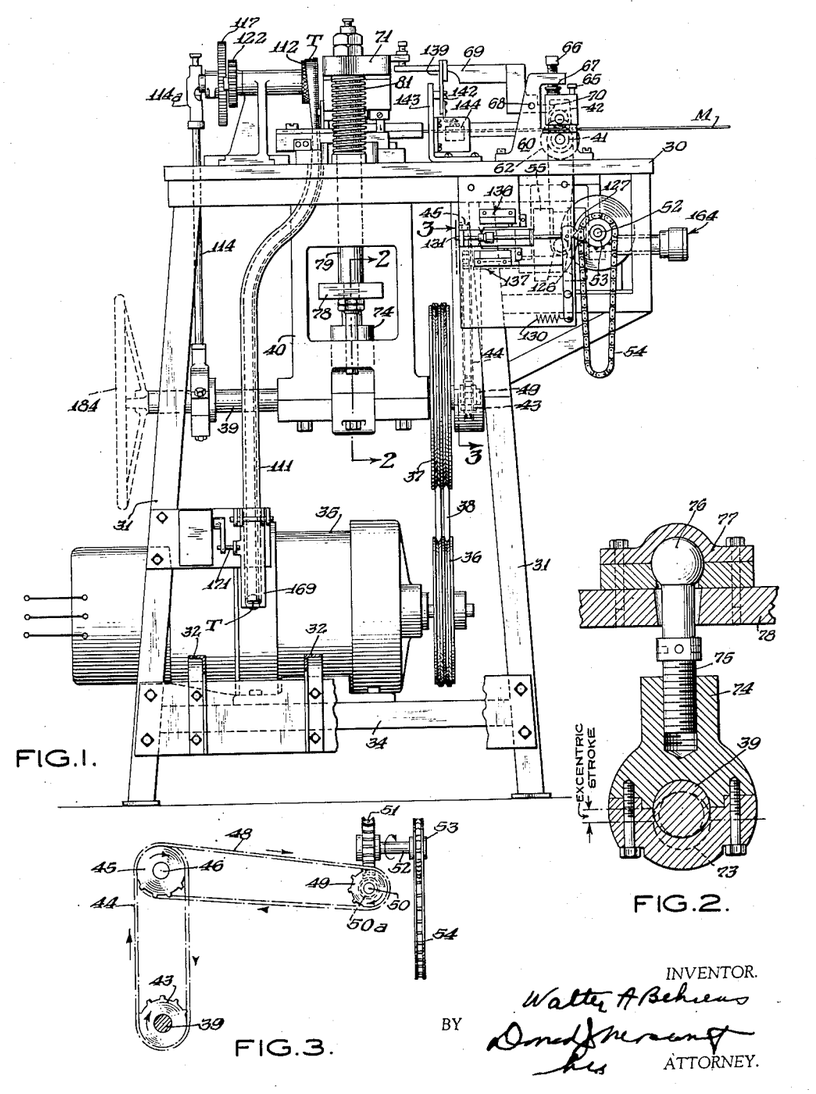
Figure 1 is a front elevation of a preferred embodiment of the apparatus for forming slide fastener stringers in accordance with the present invention.
Figure 2 is an end elevation taken in section along lines 2—2 of Figure 1.
Figure 3 is an end elevation taken in section along lines 3—3 of Figure 1.
Figures 4, 5:
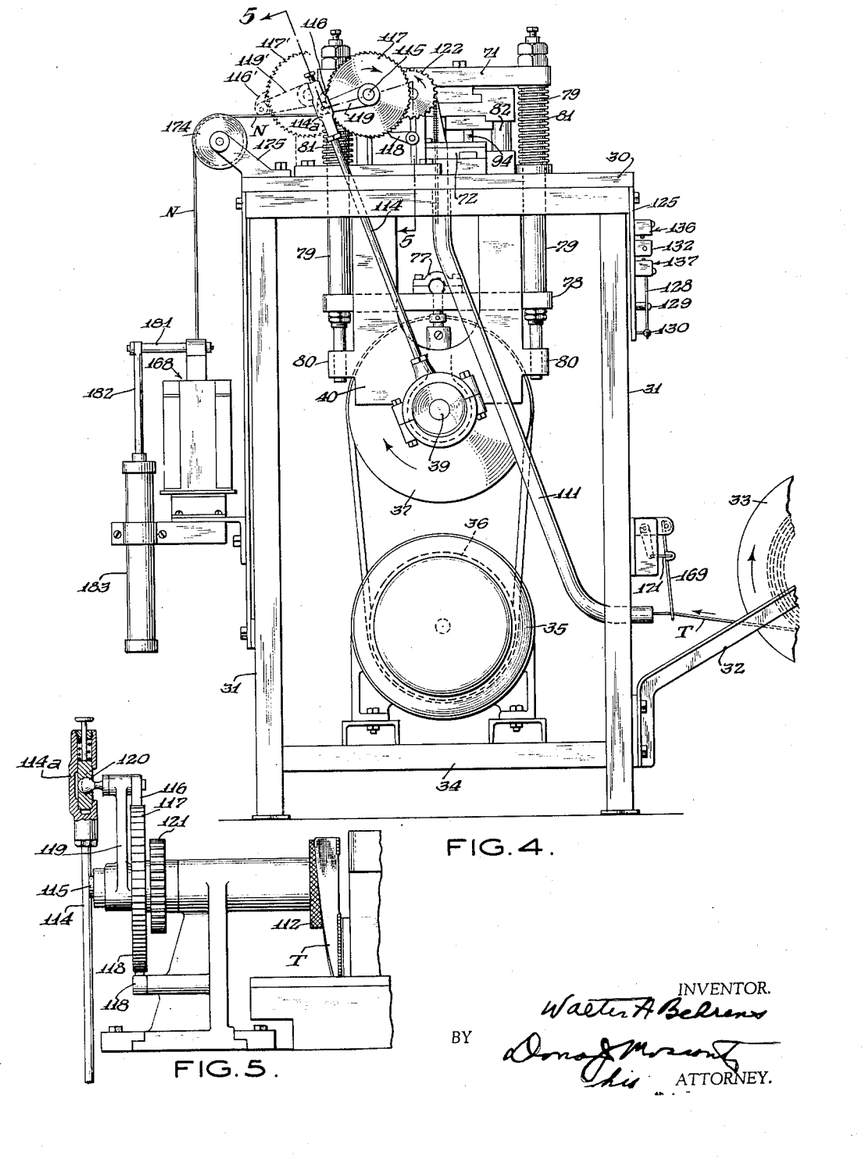
Figure 4 is a side elevation of the apparatus.
Figure 5 is an end elevation taken in section along lines 5—5 of Figure 4.
Figure 6:
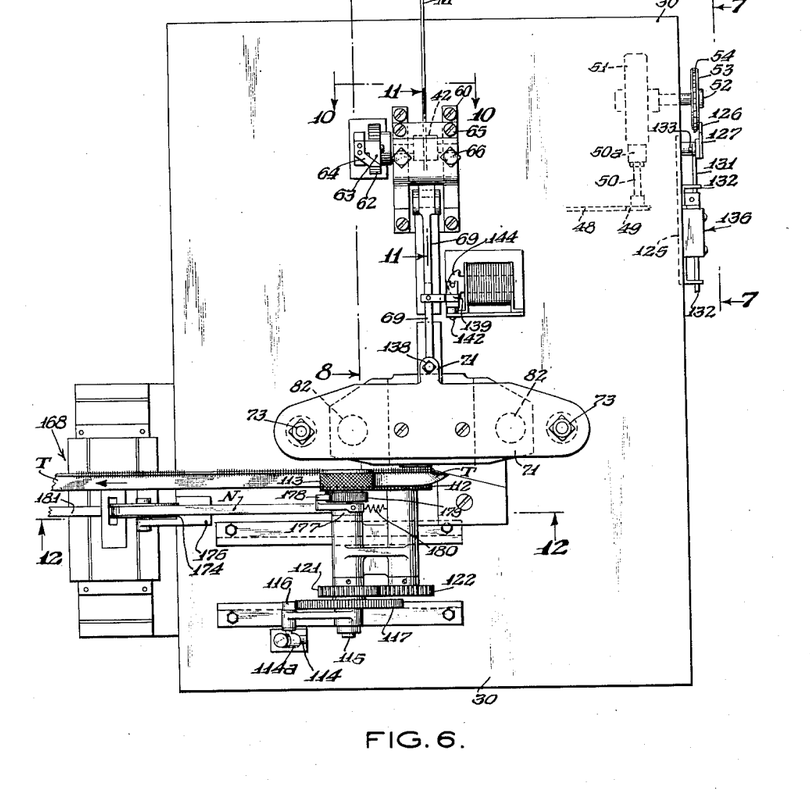
Figure 6 is a plan view of the apparatus.

Referring to the drawings in general, the apparatus for forming continuous slide fastener stringers is shown in assembly in Figures 1, 4 and 6 and comprises (a) a metal strip feed; (b) a stringer forming mechanism comprising blanking and clamping members; (c) a tape feed mechanism; (d) a tape jump mechanism; the tape jump mechanism being operable through electrical contacts from a separate electric source, while all the other mechanisms are operable from a common mechanical drive having a common source of power.

On the table 30 of the apparatus are remounted the stringer forming mechanism, the metal strip feed, the tape feed, and the tape jump mechanism, the latter being mounted below table 30. Table 30 is supported by legs 31 which in turn support bracket 32 carrying the tape spool 33 which supplies tape T. Cross bars 34 fastened on legs 31 support electric motor 35 which drives main shaft 39 by means of pulleys 36 and 37 operable through belt 38. Shaft 39 is journalled in U-shaped bracket 40 mounted on table 30.

The metal feed strip

Referring in detail to Figures 1, 3, 6, 8, 10 and 11, the metal strip feed comprises a pair of rotatably mounted rollers 41 and 42 which intermittently feed the continuous metal strip to the punch and die assembly to be described hereinafter. Roller 42 is reciprocably mounted. Sprocket wheel 43 is rotatably mounted on shaft 39 driving sprocket wheel 45 by means of chain 44, in turn rotatably mounted on shaft 46 carrying sprocket wheel 47. Wheel 47 drives sprocket wheel 49 by means of chain 48 mounted on shaft 50.

Figure 8:
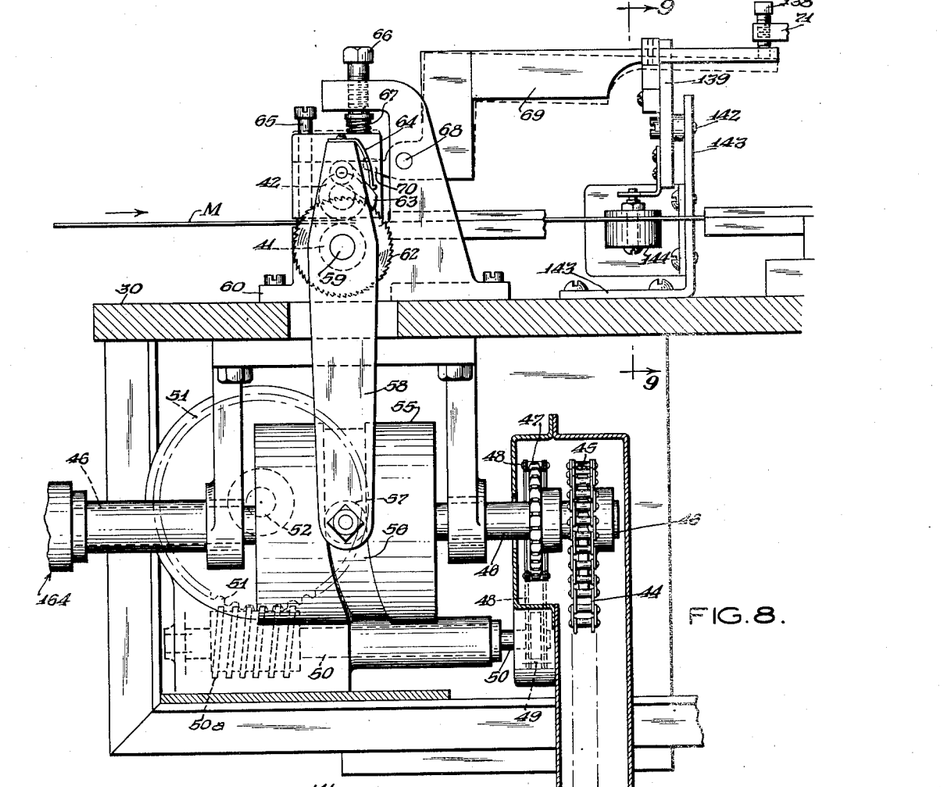
Figure 8 is an end elevation taken in section along lines 8—8 of Figure 6.
Figure 9:
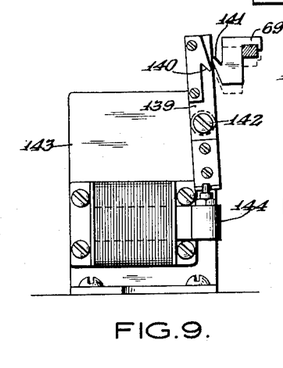
Figure 9 is an end view of a hook and latch parts associated with the metal strip feed arresting mechanism, taken in section along lines 9—9 of Figure 8.
Figure 9A:
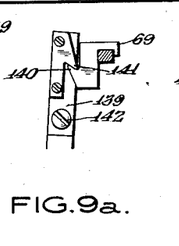
Figure 9a is a view similar to Figure 9 showing the hook in its latched position.
Figure 10:
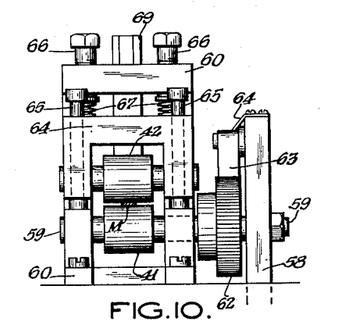
Figure 10 is an end elevation in section taken along lines 10—10 of Figure 6.
Figure 11:
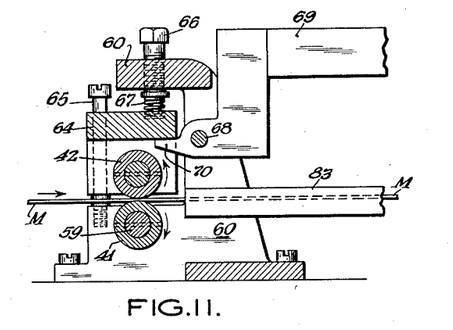
Figure 11 is an end elevation taken in section along lines 11—11 of Figure 6.

Worm 50a is rotatably mounted on shaft 50 driving worm gear 51 mounted on shaft 52 which in turn carries sprocket wheel 53 driving time chain 54. Cam 55 is rotatably mounted on shaft 46 and is provided with an angularly shaped groove 56. Roller 57 provided on lever 58, extending through table 30, is guided in groove 56. When shaft 46 is driven through shaft 39 by chain 44, lever 58 which is pivoted on shaft 59 is oscillated (Figure 8). Shaft 59 is journalled in bracket 60 secured to table 30. A ratchet disc 62 is rotatably mounted on shaft 59. Pawl 63, rotatably mounted on lever 58 is pressed downwardly by spring 61 and advances disc 62 one tooth at a time upon each rocking movement of lever 58.

It will now be evident that shaft 39 drives shaft 46 by means of sprocket wheels 43, 45 which cause cam 55 to revolve. During each revolution of cam 55 the upper arm of lever 58 is swung to the left and the right, pawl 63 advancing disc 62 tooth by tooth or several teeth at once, depending upon the shape of groove 56 and the length of the arms of lever 58. Roller 41 is intermittently rotated by such movement of disc 62.

Roller 42 is rotatably mounted in U-shaped bracket 64 which is reciprocably guided by screws 65 of bracket 60. Screws 66 are fastened in bracket 60 and are provided with compression springs 67 tending to press bracket 64 downwardly, and press rollers 42 against metal strip M, as well as against roller 41. Lever 69, pivoted on shaft 68 mounted in bracket 60, is provided with projection 70 which, if moved upwardly, is adapted to lift bracket 64 in turn reciprocably mounted on screws 65. Lever 69 is adapted to be tilted by the punch head in order to allow for the tape jump, as will be described hereinafter.

The clamping and stamping assembly and operation

The blanking and stamping assembly and associated parts are shown in detail in Figures 1, 2, 4 and 14 to 24. The assembly comprises a reciprocable male punch head 71 and a female die section 72 mounted on table 30. Eccentric 73 carried by main shaft 39 reciprocates head member 74 provided with a screw 75, the head of which is in the form of a ball or sphere 76. Ball 76 is received in a corresponding spherical bearing formed on curved member 77 removably fastened to cross bar 78.

Cross bar 78 is fastened to posts 79 which are guided at 80 in bracket 40, and which are further guided in holes (not shown) in table 30. Springs 81 are provided between table 30 and punch head 71 which cushion the up and down movement of the punch head 71. It will now be evident that when shaft 39 rotates, eccentric 73 reciprocates the punch head 71 by means of cross bar 78 and posts 79. The stroke of eccentric 73 is comparatively small, as indicated in Figure 2.

The punch and die assembly will now be described in detail with specific references to Figures 14 to 24. On die bed 72 are mounted posts 82 which guide the punch head 71. Metal strip M is fed intermittently, as described above and is guided in guide block 83 mounted in die bed 72 to prevent lateral movement thereof. On the downstroke of punch head 71 punches 84, 85 and 86, fastened on head 71, simultaneously act upon the metal strip, punching and severing it. At first, however, metal strip M moves over plate 87 fastened on piston rod 88 which is actuated by compression spring 89 fastened in die bed 72.

On the downward stroke of punch 71 plate 90 mounted in the punch head presses down plate 87 and on the upward stroke of punch 71 plate 87 lifts the metal strip a small distance from the die bed to facilitate the clearance of the punches from the metal strip M, and the subsequent feeding movement of strip M. Thereafter, scoop heads S are formed on the strip M by means of die 91 secured to the die bed and punch 92 provided on punch head 71.

Figure 15:
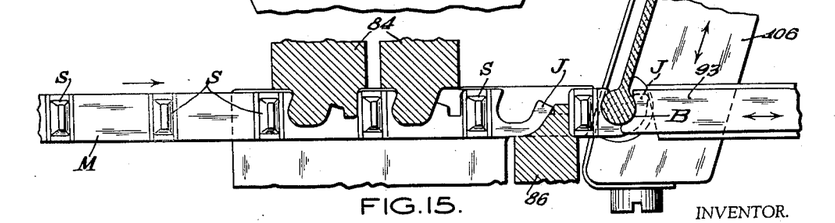
Figure 15 is a detail plan view partly in section showing the stepwise formation of the fastener element on the continuous metal strip.
Figure 16:
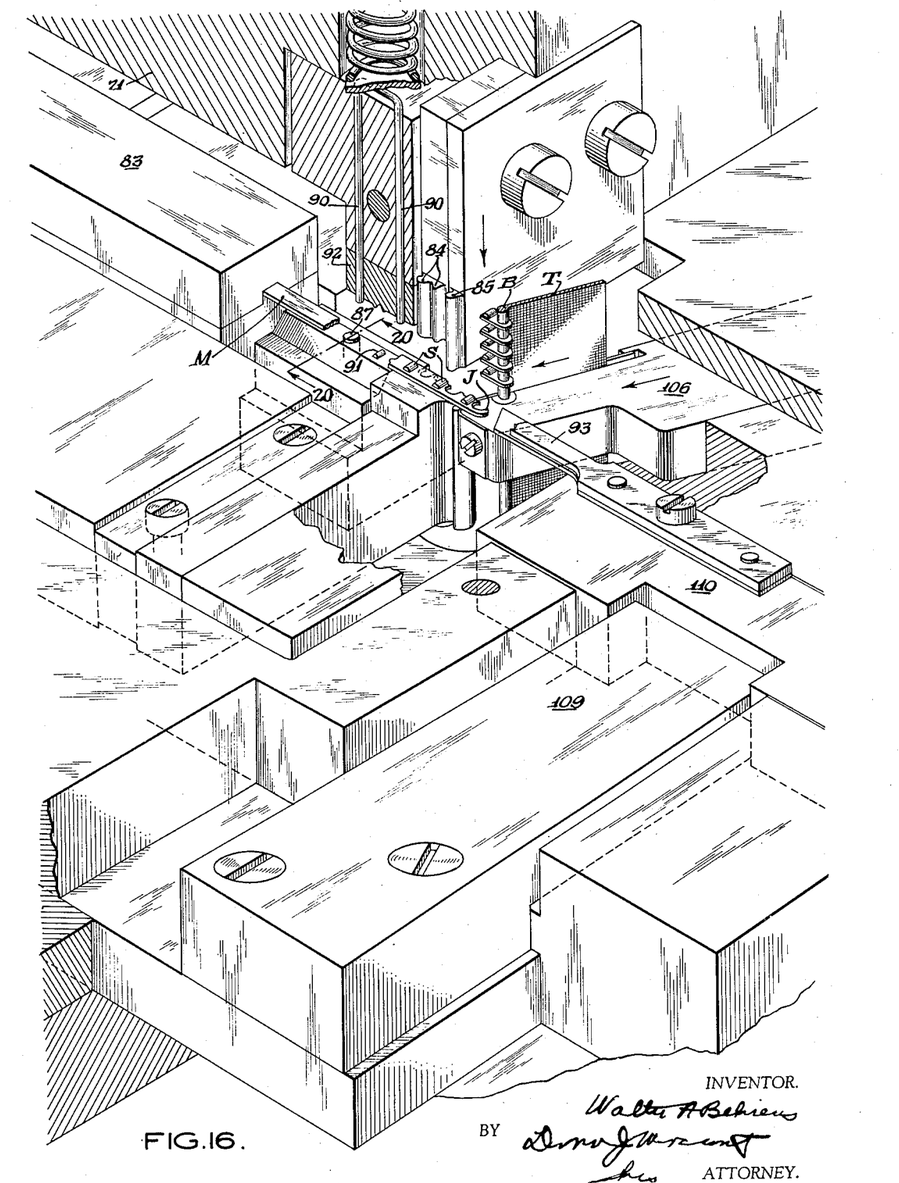
Figure 16 is a perspective view of the die assembly, the punch head being in its upper position, and the stripper plate and cut-off punch being removed.
Figure 17:
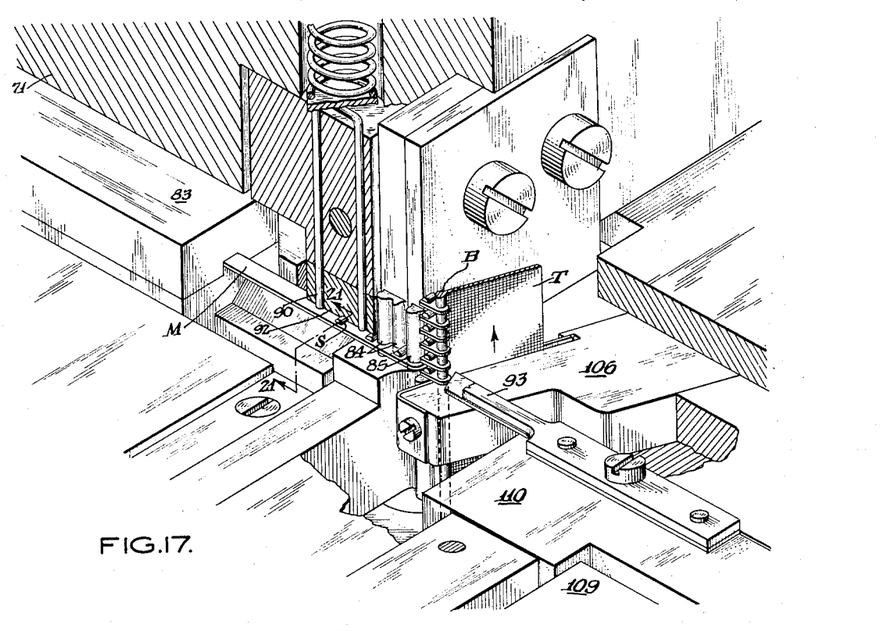
Figure 17 is a perspective view similar to Figure 16 of the die assembly with the punch head in its lower position.
Figure 18:
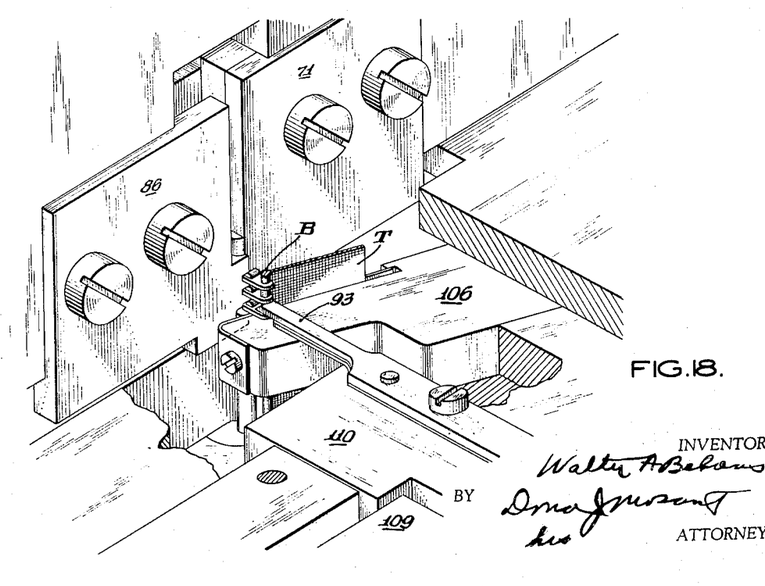
Figure 18 is a perspective view of the die assembly with the punch head in its lower position, and the stripper plate being removed.
Figure 19:
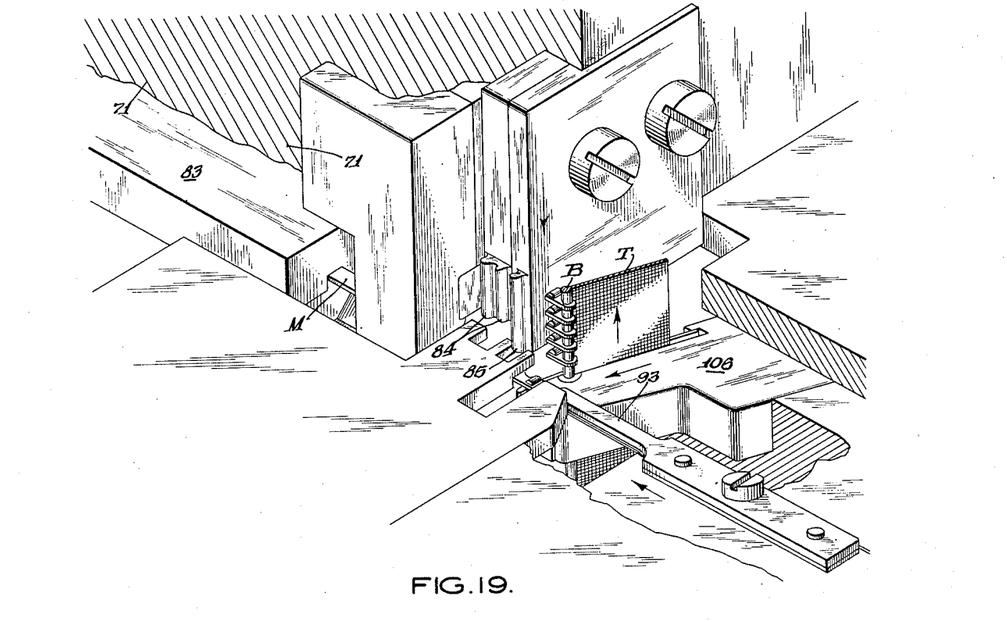
Figure 19 is a perspective view of the die assembly, the punch head being in its upper position, and the cut-off punch being removed.
Figure 20:
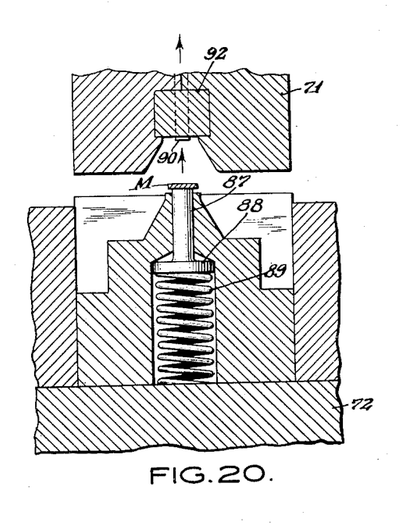
Figure 20 is an end view taken in section along lines 20—20 of Figure 16.
Figure 21:
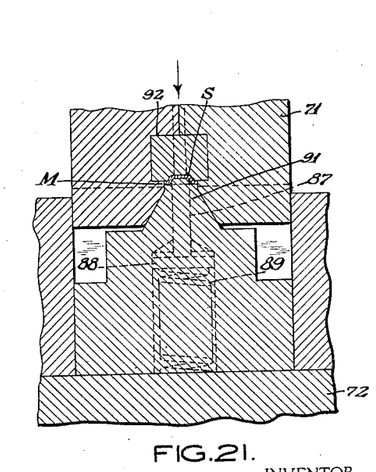
Figure 21 is an end view taken in section along lines 21—21 of Figure 17.

After the scoop heads are formed, strip M is fed under punch 84 which cuts out a predetermined outline, as shown in greater detail in Figure 15. Punch 85 serves to hold the strip in a particular position in order to insure proper severance, by severing punch 86 on the proper plate. The individual scoops are thus provided with a jaw J which serves to fasten it onto the bead B of tape T in the manner set forth in detail in the copending application referred to above. The scoops are severed from metal strips M in the last stage of their formation, as shown in Figure 15.

The synchronized movements of tape T and stringer clamping block 93 will now be described. The male punch carries two posts 94 and 95 provided with bevel formations 96 and 98 respectively, cooperating with beveled surfaces 97 and 99 provided in the reciprocably mounted plates 100 and 101 which in turn actuate tape carrying block 106 and clamping block 93. As may be seen in Figures 22 and 24, post 94 is somewhat longer than post 95. This causes beveled surface 96 to first engage with cam 97 of plate 100.

Figure 14:
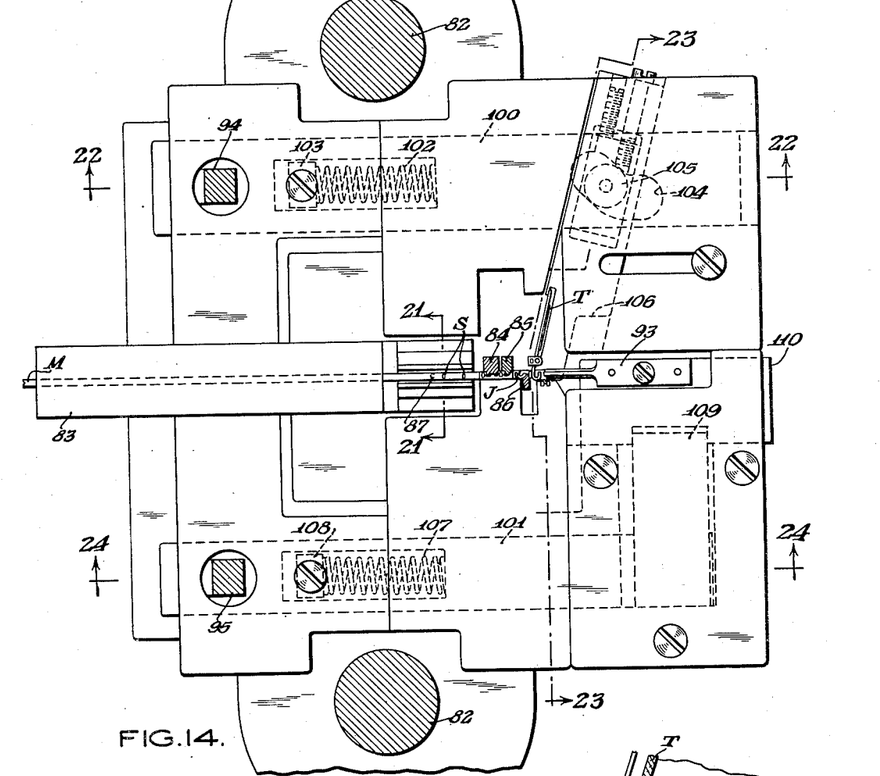
Figure 14 is a plan view of the die bed assembly, with parts thereof partially broken away.
Figure 22:
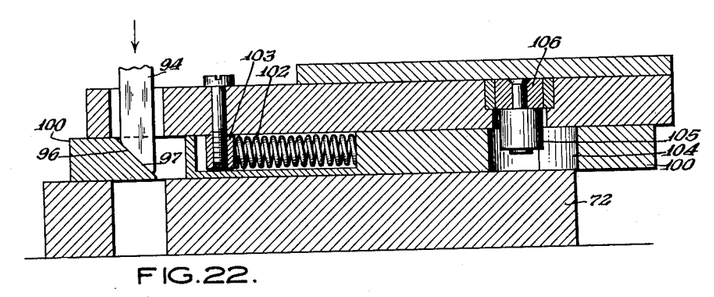
Figure 22 is an end view taken in section along lines 22—22 of Figure 14.
Figure 23:
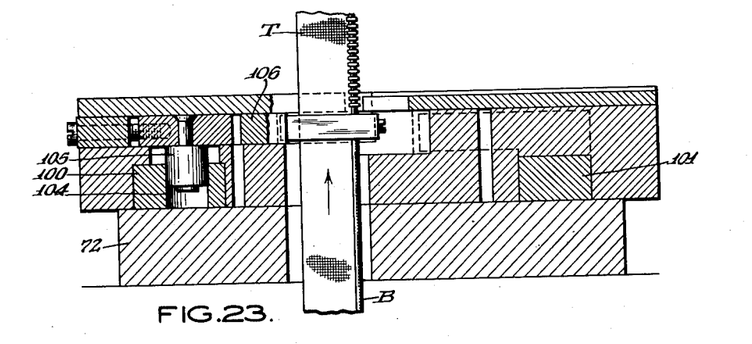
Figure 23 is an end view taken in section along lines 23—23 of Figure 14.
Figure 24:
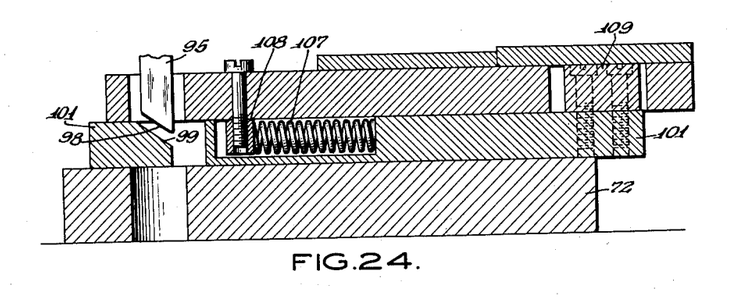
Figure 24 is an end view taken in section along lines 24—24 of Figure 14.

The downward stroke of the male punch causes a displacement to the left of plate 100, Figures 14 and 22. A compression spring 102 is arranged between plate 100 and screw 103 fastened in the die bed. Plate 100 is provided with an angularly shaped groove 104 into which fits roller 105 provided on tape carrying plate 106. A displacement of plate 100 to the left (Figure 14), causes tape carrying plate 106 to move downwardly. Coacting groove 104 is shaped so that a downstroke of punch head 71, causing a displacement of plate 100 to the left, produces at first a rapid movement of tape carrying plate 106 and, thereafter, downward movement of post 94 does not cause further movement of tape carrying plate 106.

When the male punch moves further on downwardly, surface 98 contacts surface 99, causing a displacement of plate 101 to the left (Figure 14). Spring 107, arranged between plate 101 and screw 108 fastened on the die bed, serves to return plate 101 upon the upward stroke of the male punch. Plate 109, being integral with plate 101, is also moved to the left upon the downward stroke of the punch, and plate 109 in turn moves plate 101 carrying clamping punch 93.

The downward stroke of the male punch accordingly causes plate 100 to move to the left, and thereafter the movement of plate 101. The movement of plate 100 causes a downward movement of tape carrying plate 106, bringing tape T from the position shown in Figure 16 to that shown in Figure 17, i. e. into alignment with the metal strip M. Further downward movement of the male punch head does not produce a corresponding further movement of tape carrying plate 106. The movement of plate 101 towards the left (Figure 14) causes a corresponding movement of plate 110, carrying clamping punch 93, following the movement of plate 106. After tape T is in alignment with metal strip M clamping punch 93 presses jaw J against bead B, and severing punch 86, which has previously been moved down by the male punch, holds the scoop firmly while jaw J is clamped on bead B of tape T.

On the upward stroke of the male punch, punches 84, 85 and 86 move also upward, releasing the metal strip. Plates 100 and 101 are thereupon released from beveled surfaces 94 and 95, and springs 102 and 107 return plates 100 and 101 into their original position. The return movement of plates 100 and 101 causes the clamping punch 93 to move away from the metal strip, and tape carrying member 106 then moves out of alignment with the metal strip. The metal strip is then free to advance another step while the tape T is also free to advance into a position for the next scoop to be clamped onto its bead B.

The tape feed arrangement

The tape feed arrangement is shown in Figures 1, 4, 5, 6, 12 and 13. The tape is unwound from spool 33, passed through tube 111, moved through a hole in table 30 and through tape carrier plate 106. Tape T is fed by the intermittent rotation of knurled wheels 112 and 113, in the following manner. On main shaft 39 is mounted an eccentric (not shown) which reciprocates lever 114, caused by the rotation of shaft 39 and operates pawl 116 over ratchet disc 117. Reverse movement is prevented by pawl 118.

Disc 117 is fastened on shaft 115 which carries knurled wheel 113. Arm 119 of lever 114, which carries pawl 116 and which connects lever 114 with shaft 115, is journalled in ball joint 120. Gear 121, mounted on shaft 115, meshes with gear 122 in turn mounted on shaft 123 carrying knurled wheel 112. Thus, lever 114 advances wheel 117 one or several teeth for each revolution of shaft 39, causing a positive rotation of knurled wheels 112 and 113 in opposite directions through the intermediary of gears 121 and 122. An important feature of the reciprocatory drive of ratchet disc 117 resides in the detachability of driving rod 114 from crank 119 and operating pawl 116 to permit ready access to the tape T within the mechanism. Towards this end, a removable connection 114a is provided at the top end of rod 114 and crank arm 119. The ball joint 120 is removable from its connection 114a on rod 114, through the spring joint connection shown. When thus dissembled the assembly carrying pawl 116, ratchet disc 117, and arm 115, is movable to the left in Figure 4 as indicated in dotted at positions 116', 117' and 119', to permit access to tape T.

The time chain, metal feed latch and tape jump mechanism

An important feature of the present invention resides in materially reducing the time required in providing the blank spaces or jumps between successive stringer sections. In the preferred arrangement to be described, a blank space or jump of any desired length is made feasible within four strokes or cycles of operation of the machine, so as not to strain the machinery or require any excessive rate of speed therein. Each stroke corresponds to the cycle required for attaching a single scoop on tape T. Thus, in a practical case, where an 8-inch zipper or stringer is made, 22 strokes or cycles of operation of the machine is generally employed for the space between successive completed stringers. In accordance with the present invention, the 22-cycle space is provided by a corresponding jump of the tape, preferably within four strokes or cycles of the machine. This corresponds to an increase in the production capacity of 20% in making the 8-inch zippers. Corresponding production increases will apply for different lengths of stringers.

In accordance with the preferred arrangement for effecting the predetermined tape jumps, electro-mechanical means are used with interlocking controls to prevent destructive action in event of electric contact failure. Electrical controls are provided to select the proper phase of the cycle in which the jump takes place, which phase corresponds to the time when the tape is free to move, and no scoop element is being attached thereon. The jumping mechanism is operated through separate electrical control means without straining any mechanical operation of the stringer making mechanism.

Referring now to Figures 1, 3, 7, 7a, the timing chain 54 is shown, arranged on sprocket wheel 53 for determining the length of the individual slide fasteners or stringers by initiating the tape jumping action referred to. As described above, pulley 53 is actuated by main shaft 39 through sprocket wheels 43, 45 driven by sprocket chain 44, by sprocket wheels 47, 47 driven by sprocket chain 48, and by worm and worm gear 50a, 51. Timing chain 54 is thus rotated when shaft 39 is rotated. Arm 124 is mounted on leg 31. Bracket 125 is fastened to the table 30 and to arm 124. Shaft 52 of sprocket wheel 53 is journalled in bracket 125.

Figure 7:
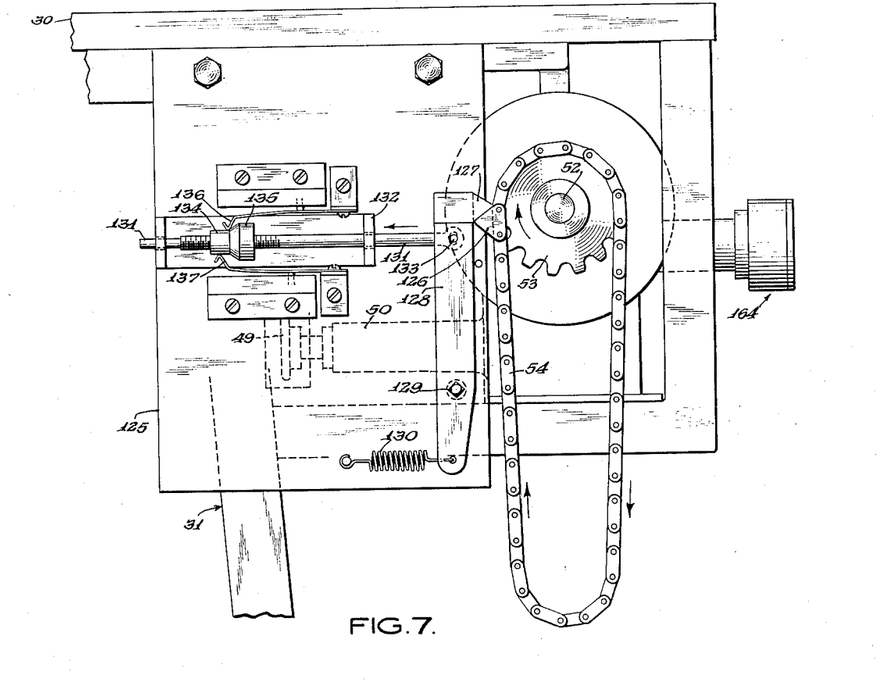
Figure 7 is an end view of the timing chain and associated parts taken along lines 7—7 of Figure 6.

Timing chain 54 is provided with a projecting dog or lug 126 cooperating with projection 127 of lever 128 pivotally mounted on bracket 125 at 129. The shorter arm of lever 128 is provided with spring 130 fastened on bracket 125, biasing it to the left (Figure 7). Rod 131 is guided at 132 in bracket 125 and is pivotally mounted at 133 on lever 128. Rod 131 is provided with an adjustable ring 134 having a shoulder 135 which is adapted to actuate cam or spring switches 136 and 137.

Figure 7A:
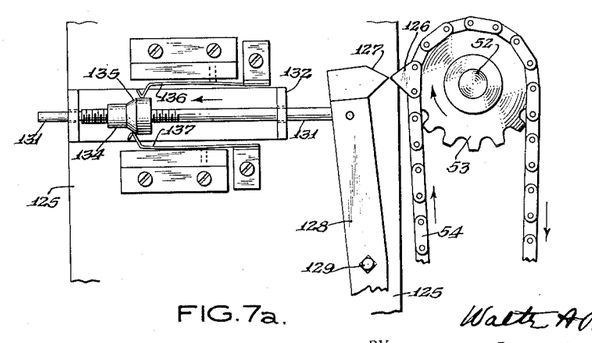
Figure 7a is a view similar to Figure 7 showing the timing chain and the contact operated thereby in a different position.

When dog 126 contacts projection 127, rod 131 is pushed to the left as shown in Figure 7a, and shoulder 135 of ring 134 operates electrical switch arms 136 and 137. Switches 136 and 137 are arranged in such manner that switch 136 is closed first and switch 137 thereafter. Switches 136 and 137 control the operation of the tape jump mechanism. The length of timing chain 54 and its rate of travel determine the stringer length, i. e., the number of scoops on each chain or group spacedly fastened on tape T. The length of the completed slide fasteners is determined by adjusting the length of chain 54.

As will be explained in detail in connection with Figures 8, 9, 9a, 10 and 11, the closing of switch 136 by timing chain 54 operates the metal feed latch to arrest the advance of strip M. Lever 69, pivoted at 68, lifts bracket 64 by means of projection 70. Punch head 71 actuates lever 69. Adjusting screw 138 serves for adjustment of the rocking movement of lever 69. Metal strip M can only be fed when roller 42 presses against roller 41. However, when projection 70 of lever 69 lifts bracket 64, roller 42 is disengaged from roller 41.

Ordinarily, roller 42 will be disengaged from roller 41 only during the downstroke of punch head 71. Lever 69 is provided with hook 140 which cooperates with hook 141 of lever 139, rotatably mounted on screw 142, in turn fastened to bracket 143 mounted on table 30. Magnet 144, also mounted on bracket 143', is adapted, when energized, to pull lever 139 towards the magnet, causing hook 141 to engage with hook 140 during the downstroke of punch head 71.

Lever 69 is then held by hook 141 in the position shown in dotted lines in Figure 8, when projection 70 lifts bracket 64 and roller 42 disengages roller 41. Rotation of roller 41 does not advance the metal strip as long as hook 141 engages with hook 140 of lever 69. However, as soon as magnet 144 is deenergized, the downstroke of punch head 71 disengages hooks 140 and 141. Upon the upstroke of punch head 71, roller 42 will engage roller 51 and advance the metal strip M one step further.

Figure 25:
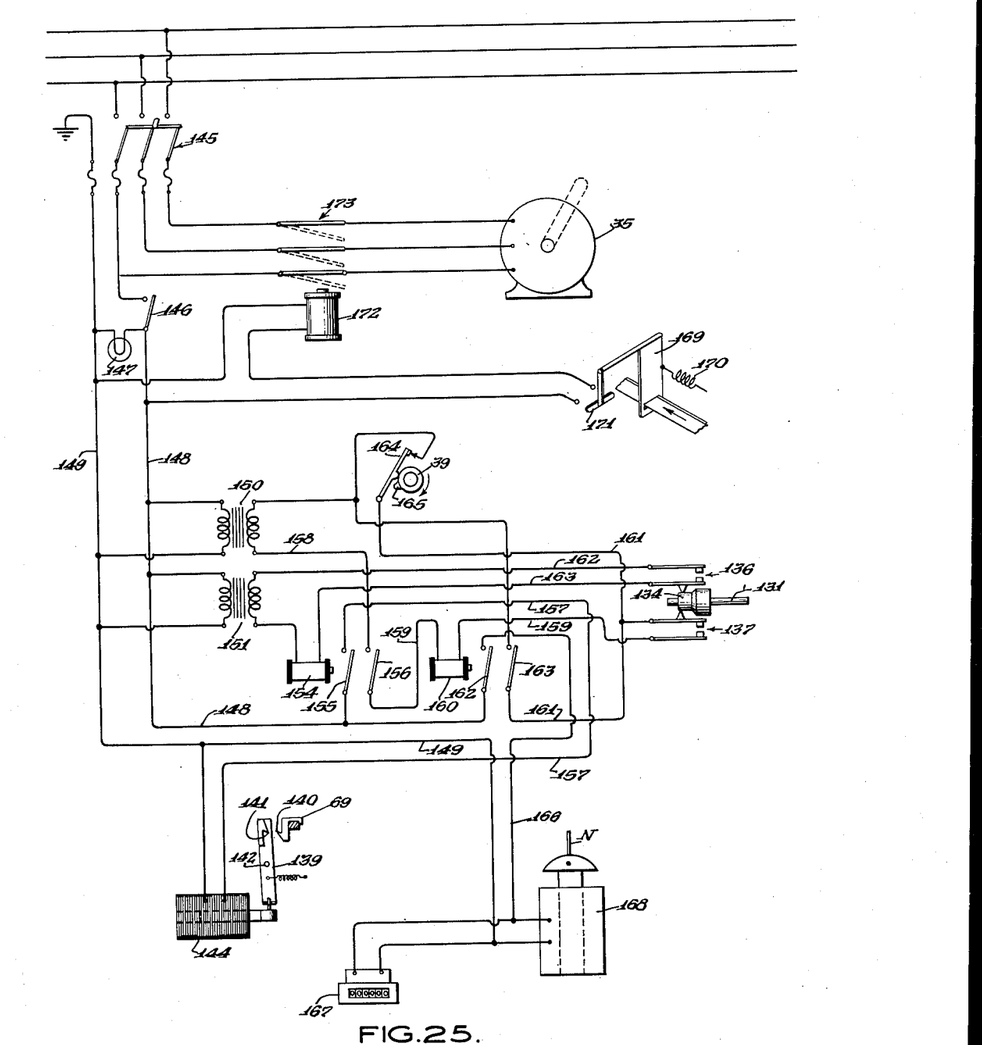
Figure 25 is a diagrammatic view of the electrical connections and arrangements associated with the tape jump mechanism of the present invention.

The operation of the tape jump mechanism will now be described, particularly in connection with Figures 25, 4 and 12. As shown in Figure 25, motor 35 is a three-phase motor, supplied by the main current supply through main switch 145. A switch 146 is provided in current lead 148. Pilot lamp 147 serves to indicate when lines 148 and 149 are energized. Transformers 150 and 151 are provided in the circuit for reducing the voltage applied for the two relay circuits to be described.

When switch 136 is closed, through the action of timing chain 54, leads 152 and 153 are interconnected with transformer 151, energizing relay 154 to cause the closing of switches 155 and 156. Closure of switch 155 connects line 148 with lead 157, thus energizing strip M feed arresting magnet 144. This action effects the latching of lever 69, preventing further intermittent feeding of metal strip M. The movement of ring 134, actuated by dog 126 of timing chain 54 thus first causes the inaction of the metal feed roller 42, stopping strip M.

The next operation in the cycle comprises the closing of switch 137 which connects transformer 150 with relay solenoid 160 by means of lead 158 through switch 156 previously closed by relay 154 through the action of switch 136. This is a safety interlocking action. The circuit is thus completed for relay 160, which closes switches 162 and 163. It will now be evident that relay 160 can only be actuated when switch 156 has previously been closed, assuring that the next step may take place only when metal strip M feed latch is actuated. It will further be evident that relay 160 can only be actuated when timer switch 164 is closed.

Timer switch 164 is cyclically operated by cam 165 on main drive shaft 39. Opening of timer switch 164 takes place only during the downstroke of the punch head, i. e., when tape T is moved into the path of metal strip M by tape carrier plate 106. Switch 164 is thus closed only when tape T is free to be advanced or jumped. When closed, switch 162 connects lead 148 with lead 166, which in turn connects a counter device 167 in parallel with jumper magnet 168, to mains 148, 149.

Counter device 167 counts the individual slide fasteners or stringers formed by the machine. The purpose of jumper magnet 168 will become apparent shortly. The closing of switch 163 short-circuits timer switch 164. When relay 160 is actuated, the cyclic opening of timer switch 164 thus does not interrupt the current energizing magnet 168, or otherwise interfere with the tape jumping operation.

Figure 13:
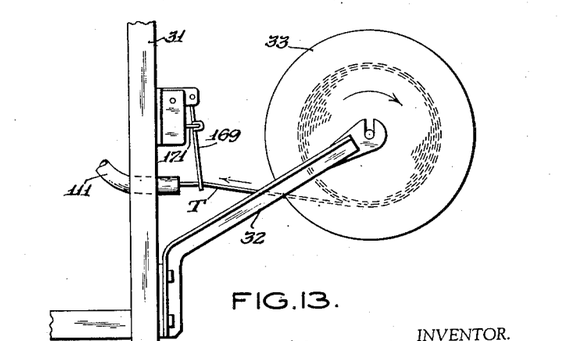
Figure 13 is a side view of the tape spool and a safety switch.

Safety switch 171, see also in detail in Figures 4 and 13, is actuated by lever 169 provided with spring 170. Should tape T, unwinding from spool 33 be bent over or otherwise not be smooth, lever 169 closes switch 171, which energizes relay 172 to open switch 173, disconnecting motor 35 from the main current supply, and stop the operation of the machine.

Figure 12:
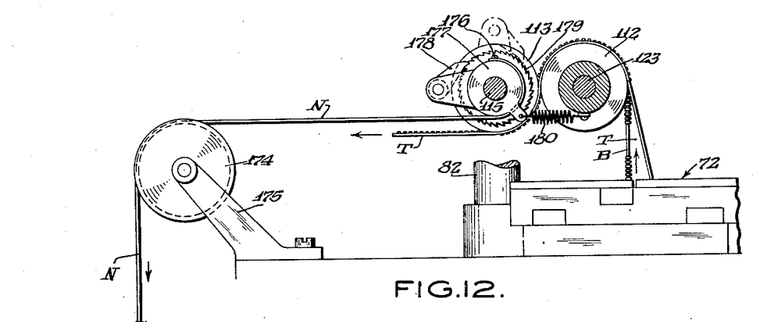
Figure 12 is an end elevation in section taken along lines 12—12 of Figure 6.

The actual tape jump mechanism of the disclosed embodiment may be seen in Figures 4 and 12. Should jump magnet 168 be energized as described herein, pull cord N, guided over pulley 174 rotatably mounted on bracket 175, is drawn downwards as indicated by the arrow. Cord N is fastened to disc 177 by screw 176, which disc is rotatably mounted on shaft 115. Pawl 178 is mounted on an extension of disc 177, and engages ratchet 179 fixedly mounted on shaft 115. Spring 180, fastened to disc 177, biases disc 177 counterclockwise.

When jump magnet 168 is energized, pull cord N rotates disc 177 clockwise, causing pawl 178 to turn ratchet 179 by a predetermined angular amount. Knurled roller 113, fastened to shaft 115, is rotated together with ratchet 179, pulling tape T by knurled rollers 112 and 113 by an amount corresponding to the movement of cord N. This distance is the exact predetermined jump distance required between the stringers, and is effected fully within four strokes of operation. The time interval of passage or action of the dog 126 of chain 54 corresponds to the four strokes or cycles. More or less strokes may be thus employed.

When magnet 168 is deenergized, cord N returns to its inoperative position through the action of biasing spring 180. Knurled rollers 112 and 113 then resume their intermittent feed of tape T through the action of ratchet 117 as described. To dampen the movement of pull cord N by magnet 168, dash-pot or mechanical damping device 183 is used, as shown in Figure 4. Towards this end, rod 182 of pneumatic plunger device 183 is coupled to the plunger of jump magnet 168. A hand wheel 184, shown in dotted lines in Figure 1, may be provided on main drive shaft 39 to permit manual rotation of this shaft. Spring 130 (Figure 7) biases switch rod 131 to the left to open circuit switches 136, 137 when dog 126 passes to restore normal stringer forming operation in the machine.

In summary, the novel tape jumping arrangement of the present invention operates as follows: The timer chain is driven at a predetermined rate in synchronism with the driving of the machine, and contains a projection or dog 126 which initiates the tape jumping operation at predetermined intervals. The length of the chain is adjustable for different blank spacings or lengths of stringers, as is understood. When timer chain dog 126 presses against projection 127 of lever 128 (Figure 7, 7a) electrical switches 136 and 137 are successively closed to correspondingly successively operate relays 154 and 160. The energization of relay 154 causes solenoid 144 to move latch portion 141 towards latch 140, to arrest the feeding of the metal scoop strip M, as described in connection with Figures 8, 9, 9a and 11.

Relay 160, being interlocked through switch 156, cannot be energized until relay 154 has first been energized, and therefore until the feeding of metal tape M is arrested. Relay 160, furthermore, cannot be energized except when timer switch 164 is closed, as determined by timer cam 165, when the punch is out of the die and tape T is free to be moved. Thereupon, tape advancing solenoid 168 is energized to move pull-cord N a predetermined amount as disclosed in connection with Figure 12. A cushioning means, such as air cylinder 183, (Figure 4) is attached to the plunger of solenoid 168. The movement of pull-cord N advances ratchet disc 179 a predetermined amount which, due to attached knurled feed roller advances tape T the predetermined length corresponding to the desired blank space. An electro-magnetic counter 161 is connected in circuit with solenoid 168 to count the number of jumps performed by the machine, and therefore corresponds to the number of completed slide fasteners made. The cycle is repeated for each revolution of timing chain 54.

Although a preferred embodiment of the stringer forming and tape jumping mechanism has been disclosed in accordance with the present invention, it is to be understood that variations and modifications therein may be made coming within the broader spirit and scope thereof, as defined in the following claims.

What I claim is:

1. The combination with a continuous slide fastener forming machine having apparatus for successively attaching scoops onto a tape, of means for producing blank spaces between groups of scoops on the tape comprising an instrumentality for jumping the tape, and means for controlling the operation of said instrumentality in synchronism with the continuous operation of the machine comprising a timing component and electrical switching means actuated by said component, and a timer switch in circuit with said switching means to insure energization thereof only at a predetermined phase in the cycles of operation of the machine.

2. The combination with a continuous slide fastener forming machine having apparatus for successively attaching scoops onto a tape, of means for producing blank spaces between groups of scoops on the tape comprising an instrumentality for jumping the tape, and means for controlling the operation of said instrumentality in synchronism with the continuous operation of the machine comprising a timing chain with a dog driven synchronously with the machine, electrical switching means intermittently actuated by said dog, and a timer switch in circuit with said switching means to insure energization thereof only at a predetermined phase in the cycles of operation of the machine including circuit connections to render said timer switch ineffectual upon energization of said switching means whereby the tape jumping operation may occur over an interval of several cycles of operation of the machine.

3. The combination with a continuous slide fastener forming machine having apparatus for successively attaching scoops onto a tape, of means for producing blank spaces of predetermined amounts between groups of scoops on the tape comprising an instrumentality for jumping the tape, and means for controlling the operation of said instrumentality in synchronism with the continuous operation of the machine comprising a timing chain with a dog driven synchronously with the machine, electrical switching means intermittently actuated by said dog, and a timer switch in circuit with said switching means to insure energization thereof only at a predetermined phase in the cycles of operation of the machine including circuit connections to render said timer switch ineffectual upon energization of said switching means, whereby the tape jumping operation may occur over an interval of the order of four cycles of operation of the machine as determined solely by the duration of coaction between said dog and said switching means.

4. The combination with a continuous slide fastener forming machine having apparatus for successively attaching scoops onto a tape, of means for producing blank spaces of predetermined lengths comprising an instrumentality for rapidly advancing the tape by amounts corresponding to the lengths of said blank spaces embodying feed rollers for the tape, an element coupled to said feed rollers and a solenoid having a plunger for actuating said element to advance said rollers to advance the tape, and means for controlling the operation of said instrumentality in synchronism with the continuous operation of the machine comprising a timing component with a dog driven synchronously with the machine, electrical switching means actuated by said dog for operating said element, and a timer switch in circuit with said switching means to insure energization thereof only at a predetermined phase in the cycles of operation of the machine including circuit connections to render said timer switch ineffectual upon energization of said switching means whereby the tape advancing operation may occur over an interval of several cycles of operation of the machine as determined solely by the duration of coaction between said dog and said switching means.

5. The combination with a continuous slide fastener forming machine having mechanism for intermittently feeding a continuous metal strip and apparatus for shaping individual scoops from the metal strip and successively attaching the scoops onto a tape, of means for producing blank spaces of predetermined amounts between groups of scoops on the tape comprising a device for positively arresting the feeding of the metal strip for a predetermined integral number of feeding strokes, an instrumentality for jumping the tape by amounts corresponding to the lengths of said blank spaces, and means for controlling the operation of said device and said instrumentality in synchronism with the continuous operation of the machine comprising a timing component driven synchronously with the machine, electrical switching means intermittently actuated by said timing component including a first switch arranged for operating said device to arrest the feeding of the metal strip, and a second switch arranged for operating said instrumentality for jumping the tape, said second switch being actuated subsequently to the actuation of said first switch whereby the metal strip is held stationary during the jumping of the tape.

6. The combination with a continuous slide fastener forming machine having mechanism for intermittently feeding a continuous metal strip and apparatus for shaping individual scoops from the metal strip and successively attaching the scoops onto a tape, of means for producing blank spaces of predetermined amounts between groups of scoops on the tape comprising a device for positively arresting the feeding of the metal strip for a predetermined integral number of feeding strokes, an instrumentality for jumping the tape by amounts corresponding to the lengths of said blank spaces, and means for controlling the operation of said device and said instrumentality in synchronization with the continuous operation of the machine comprising a timing component driven synchronously with the machine, electrical switching means intermittently actuated by said timing component including a first switch arranged for operating said device to arrest the feeding of the metal strip, and a second switch arranged for operating said instrumentality for jumping the tape, said second switch being actuated subsequently to the actuation of said first switch whereby the metal strip is held stationary during the jumping of the tape, and a timer switch in circuit with said second solenoid to insure energization thereof only at a predetermined phase in the cycles of operation of the machine.

7. The combination with a continuous slide fastener forming machine having mechanism for intermittently feeding a continuous metal strip and apparatus for shaping individual scoops from the metal strip and successively attaching the scoops onto a tape, of means for producing blank spaces of predetermined amounts between groups of scoops on the tape comprising a device for positively arresting the feeding of the metal strip for a predetermined integral number of feeding strokes, an instrumentality for jumping the tape by amounts corresponding to the lengths of said blank spaces, and means for controlling the operation of said device and said instrumentality in synchronism with the continuous operation of the machine comprising a timing component driven synchronously with the machine, electrical switching means intermittently actuated by said timing component including a first switch arranged for operating said device to arrest the feeding of the metal strip, and a second switch arranged for operating said instrumentality for jumping the tape, said second switch being actuated subsequently to the actuation of said first switch whereby the metal strip is held stationary during the jumping of the tape, and a timer switch in circuit with said second solenoid to insure energization thereof only at a predetermined phase in the cycles of operation of the machine, whereby the tape jumping operation may occur over an interval of several cycles of operation of the machine, as determined solely by the duration of coaction between said timing component and said switching means.

8. The combination with a continuous slide fastener forming machine having mechanism for intermittently feeding a continuous metal strip and apparatus for shaping individual scoops from the metal strip and successively attaching the scoops onto a tape, of means for producing blank spaces of predetermined amounts between groups of scoops on the tape comprising a device for positively arresting the feeding of the metal strip for a predetermined integral number of feeding strokes, an instrumentality for jumping the tape by amounts corresponding to the lengths of said blank spaces, and means for controlling the operation of said device and said instrumentality in synchronism with the continuous operation of the machine comprising a timing component having a dog driven synchronously with the machine, electrical switching means intermittently actuated by the dog of said timing component, including a first switch arranged for operating said device to arrest the feeding of the metal strip, and a second switch arranged for operating said instrumentality for jumping the tape, said second switch being actuated subsequently to the actuation of said first switch whereby the metal strip is held stationary during the jumping of the tape, whereby the tape jumping operation may occur over an interval of the order of four cycles of operation of the machine, as determined solely by the duration of coaction between said dog and said switching means.

9. The combination with a continuous slide fastener forming machine having mechanism for intermittently feeding a continuous metal strip and apparatus for shaping individual scoops from the metal strip and successively attaching the scoops onto a tape, of means for producing blank spaces of predetermined lengths between groups of scoops on the tape comprising a device for positively arresting the feeding of the metal strip for a predetermined integral number of feeding strokes embodying a latching member and a first solenoid for actuating said member, an instrumentality or jumping the tape by amounts corresponding to the lengths of said blank spaces embodying feed rollers for the tape, an element coupled to said feed rollers and a second solenoid having a plunger for actuating said element to advance said rollers to jump the tape, and means for controlling the operation of said device and said instrumentality in synchronism with the continuous operation of the machine comprising a timing component driven synchronously with the machine, electrical switching means actuated by said component including a first switch in circuit with said first solenoid for arresting the feeding of the metal strip, and a second switch in circuit with said second solenoid for effecting the jumping of the tape.

10. The combination with a continuous slide fastener forming machine having mechanism for intermittently feeding a continuous metal strip and apparatus for shaping individual scoops from the metal strip and successively attaching the scoops onto a tape, of means for producing blank spaces of predetermined lengths between groups of scoops on the tape comprising a device for positively arresting the feeding of the metal strip for a predetermined integral number of feeding strokes embodying a latching member and a first solenoid for actuating said member, an instrumentality for jumping the tape by amounts corresponding to the lengths of said blank spaces embodying feed rollers for the tape, an element coupled to said feed rollers and a second solenoid having a plunger for actuating said element to advance said roller to jump the tape, and means for controlling the operation of said device and said instrumentality in synchronism with the continuous operation of the machine comprising a timing component driven synchronously with the machine, electrical switching means actuated by said component including a first switch in circuit with said first solenoid for arresting the feeding of the metal strip, and a second switch in circuit with said second solenoid for effecting the jumping of the tape, said second switch being interlocked for actuation subsequently to the actuation of said first switch, whereby the metal strip is held stationary during the jumping of the tape.

11. The combination with a continuous slide fastener forming machine having mechanism for intermittently feeding a continuous metal strip and apparatus for shaping individual scoops from the metal strip and successively attaching the scoops onto a tape, of means for producing blank spaces of predetermined lengths between groups of scoops on the tape comprising a device for positively arresting the feeding of the metal strip for a predetermined integral number of feeding strokes embodying a latching member, and a first solenoid for actuating said member, an instrumentality for jumping the tape by amounts corresponding to the lengths of said blank spaces embodying feed rollers for the tape, an element coupled to said feed rollers and a second solenoid having a plunger for actuating said element to advance said rollers to jump the tape, and means for controlling the operation of said device and said instrumentality in synchronism with the continuous operation of the machine comprising a timing component driven synchronously with the machine, electrical switching means actuated by said component including a first switch in circuit with said first solenoid for arresting the feeding of the metal strip, and a second switch in circuit with said second solenoid for effecting the jumping of the tape, and a timer switch in circuit with said second solenoid to insure energization thereof only at a predetermined phase in the cycles of operation of the machine.

12. The combination with a continuous slide fastener forming machine having mechanism for intermittently feeding a continuous metal strip and apparatus for shaping individual scoops from the metal strip and successively attaching the scoops onto a tape, of means for producing blank spaces of predetermined amounts between groups of scoops on the tape comprising a device for positively arresting the feeding of the metal strip for a predetermined integral number of feeding strokes embodying a latching member and a first solenoid for actuating said member, an instrumentality for jumping the tape by amounts corresponding to the amount of said blank spaces embodying feed rollers for the tape, a pull-cord coupled to said feed rollers and a second solenoid having a plunger for actuating said pull-cord to advance said rollers to jump the tape, and means for controlling the operation of said device and said instrumentality in synchronism with the continuous operation of the machine comprising a timing chain with a dog driven synchronously with the machine and electrical switching means intermittently actuated by said dog including a first switch in circuit with said first solenoid for operating said latching member, and a second switch in circuit with said second solenoid for operating said pull-cord, said second switch being arranged for actuation subsequently to the actuation of said first switch, whereby the metal strip is held stationary during the jumping of the tape.

13. The combination with a continuous slide fastener forming machine having mechanism for intermittently feeding a continuous metal strip and apparatus for shaping individual scoops from the metal strip and successively attaching the scoops onto a tape, of means for producing blank spaces of predetermined amounts between groups of scoops on the tape comprising a device for positively arresting the feeding of the metal strip for a predetermined integral number of feeding strokes embodying a latching member and a first solenoid for actuating said member, an instrumentality for jumping the tape by amounts corresponding to the amount of said blank spaces embodying feed rollers for the tape, a pull-cord coupled to said feed rollers and a second solenoid having a plunger for actuating said pull-cord to advance said rollers to jump the tape and a damping element connected with said pull-cord for mechanically smoothing the tape jumping operation, and means for controlling the operation of said device and said instrumentality in synchronism with the continuous operation of the machine comprising a timing chain with a dog driven synchronously with the machine and electrical switching means intermittently actuated by said dog including a first switch in circuit with said first solenoid for operating said latching member, and a second switch in circuit with said second solenoid for operating said pull-cord, said second switch being arranged for actuation subsequently to the actuation of said first switch whereby the metal strip is held stationary during the jumping of the tape.

14. The combination with a continuous slide fastener forming machine having mechanism for intermittently feeding a continuous metal strip and apparatus for shaping individual scoops from the metal strip and successively attaching the scoops onto a tape, of means for producing blank spaces of predetermined amounts between groups of scoops on the tape comprising a device for positively arresting the feeding of the metal strip for a predetermined integral number of feeding strokes embodying a latching member and a first solenoid for actuating said member, an instrumentality for jumping the tape by amounts corresponding to the amount of said blank spaces embodying feed rollers for the tape, a pull-cord coupled to said feed rollers and a second solenoid having a plunger for actuating said pull-cord to advance said rollers to jump the tape and a damping element connected with said pull-cord for mechanically smoothing the tape jumping operation, and means for controlling the operation of said device and said instrumentality in synchronism with the continuous operation of the machine comprising a timing chain with a dog driven synchronously with the machine and electrical switching means intermittently actuated by said dog including a first switch in circuit with said first solenoid for operating said latching member, and a second switch in circuit with said second solenoid for operating said pull-cord, said second switch being arranged for actuation subsequently to the actuation of said first switch whereby the metal strip is held stationary during the jumping of the tape, and a timer switch in circuit with said second solenoid to insure energization thereof only at a predetermined phase in the cycles of operation of the machine including circuit connections to render said timer switch ineffectual upon energization of said second solenoid whereby the tape jumping operation may occur over an interval of several cycles of operation of the machine.

WALTER A. BEHRENS.